Jan. 5, 1965 D. G. FAWKES 3,164,401
EXPANSION JOINT
Filed Feb. 20, 1961 4 Sheets-Sheet 2

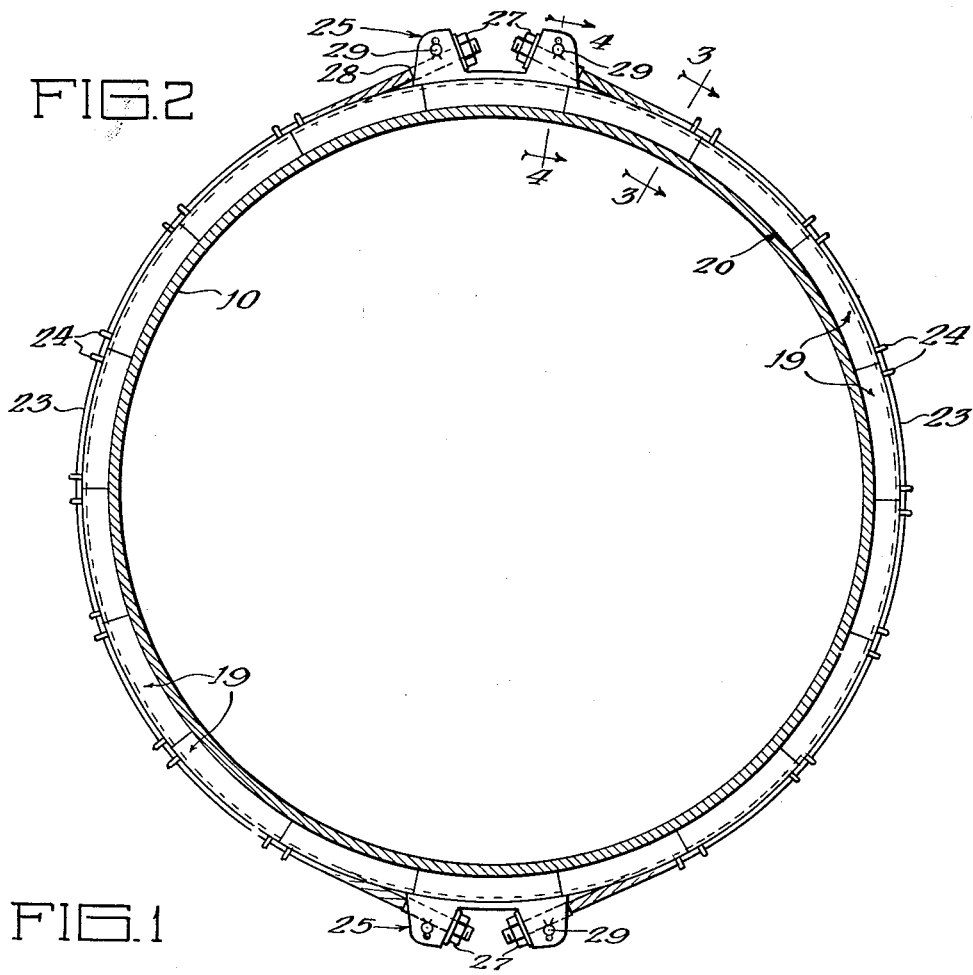
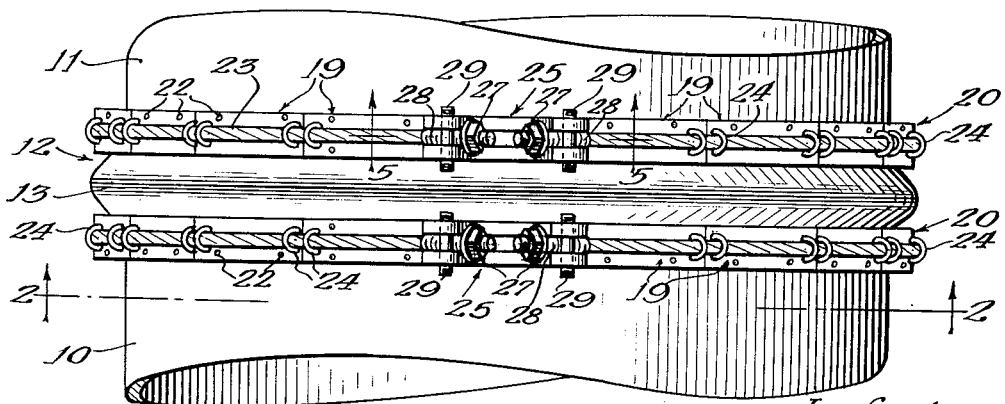

Jan. 5, 1965  D. G. FAWKES  3,164,401
EXPANSION JOINT
Filed Feb. 20, 1961  4 Sheets-Sheet 4
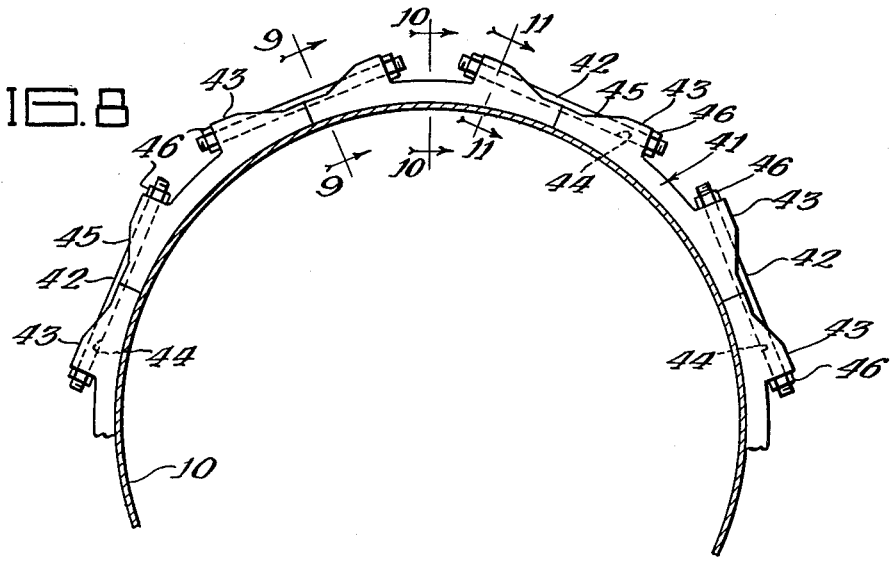
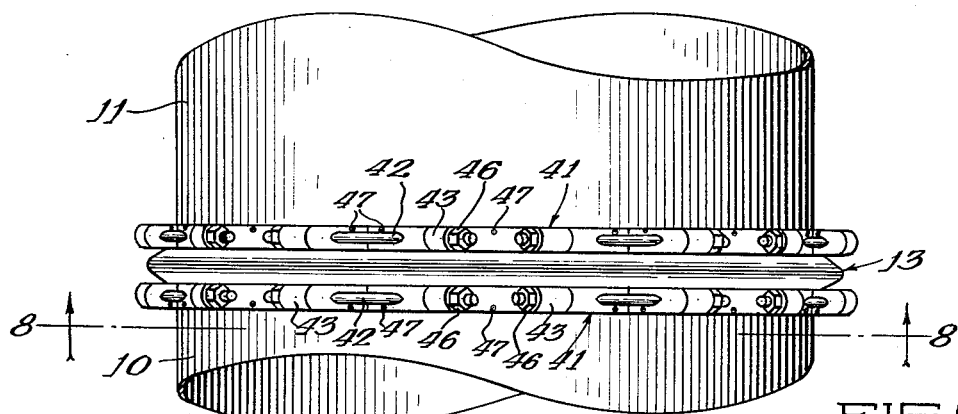
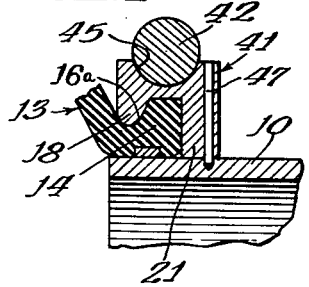
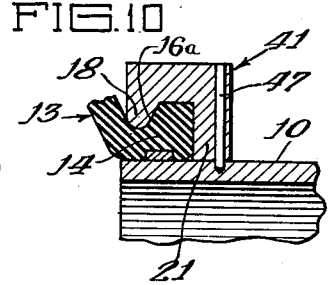
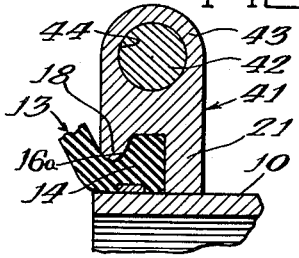

United States Patent Office 3,164,401
Patented Jan. 5, 1965

3,164,401
EXPANSION JOINT
Donald G. Fawkes, Chicago, Ill., assignor to Henry Pratt
Company, a corporation of Illinois
Filed Feb. 20, 1961, Ser. No. 90,562
8 Claims. (Cl. 285—229)

This invention relates to a pipe coupler assembly and more particularly to a flexible coupler assembly for large diameter pipes.

In various installations the connecting of large diameter pipes and fittings create numerous problems. Often the adjacent ends of the pipes or fittings are not sufficiently well aligned to facilitate the use of a conventional bolted or clamped flange connection. In replacing a section of pipe, or a fitting in a pipeline, it is often difficult to properly size and install a closely fitting section of pipe, and it may be impractical, if not impossible, to move the ends of the old piping outwardly to admit the new section and to then move the old piping into endwise abutting relationship. Under some conditions connections between large diameter pipes or fittings may be subject to vibration, as occurs with a steam turbine and condenser connection. Relatively frequent replacement may be necessary, particularly with flexible underground water or sewer main connections, so that ease of handling as well as ease of replacement is a major factor. It may be difficult to bring a large size replacement connector to the vicinity of the installation, possibly because of inadequate entrance-ways or equipment blocking a path to the installation site.

By way of specific example, a high capacity turbine often has a large diameter downwardly extending outlet for steam connected with an upwardly extending condenser inlet of like diameter. Precise alignment between the turbine outlet and the condenser inlet is in a practical sense generally impossible. The connection between the outlet and inlet is subjected to constant vibration during operation of the turbine and is generally subject to vacuum created by rapid condensation of steam passing therethrough. For these reasons a flexible coupler which is easily handled and installed is desirable. By way of a further specific example, a valve installed in a large diameter pipeline may require periodic servicing and removal from the pipeline. A close fitting connection between the valve and adjacent ends of pipe sections make removal and installation extremely difficult. Although flexible couplers such as are readily available for smaller diameter piping would appear to be a logical solution, such couplers generally have not proven to be satisfactory for large diameter piping, in part because of the greater loads encountered, and the difficulty in providing a secure and safe connection between the ends of the coupler and the spaced apart ends of the pipe sections.

A primary object of this invention is to provide a new and improved coupler assembly for pipelines.

An important object of this invention is to provide a new and improved flexible coupler assembly for easy handling and installation on large diameter piping.

Another object of this invention is to provide a coupler assembly which permits relatively great tolerances in the fitting of components of a piping system.

Still another object is to provide a large diameter pipe coupler assembly which may be compacted for easier handling.

A still further object is the provision of a coupler assembly for joining large diameter pipes wherein a flexible annulus having end sections telescopically received over and connected with adjacent pipe sections provides a passageway for fluid therebetween, with a fluid-tight seal between the annulus end sections and the adjacent pipe sections, and means urging the end sections radially inwardly and providing a tight and secure connection with the pipe sections.

These and other objects and advantages will be readily apparent from the following detailed description of preferred embodiments illustrated in the accompanying drawings, in which:

FIGURE 1 illustrates one embodiment of a coupler assembly joining adjacent ends of roughly aligned pipe sections which may be disposed in any direction;

FIGURE 2 is a section taken substantially as indicated along the line 2—2 of FIGURE 1;

FIGURE 7 is similar to FIGURE 1 but illustrates another embodiment of a coupler assembly;

Figure 3:
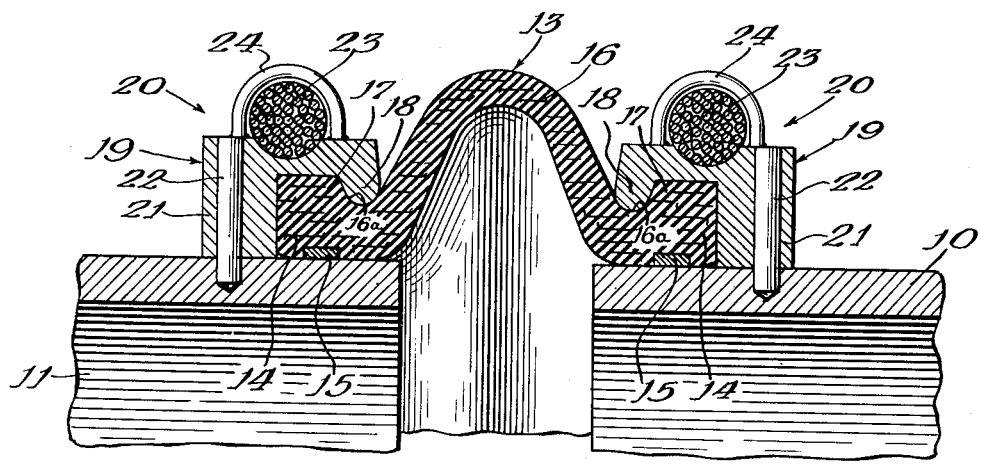
FIGURE 3 is an enlarged section taken substantially as indicated along the line 3—3 of FIGURE 2.
Figure 4:
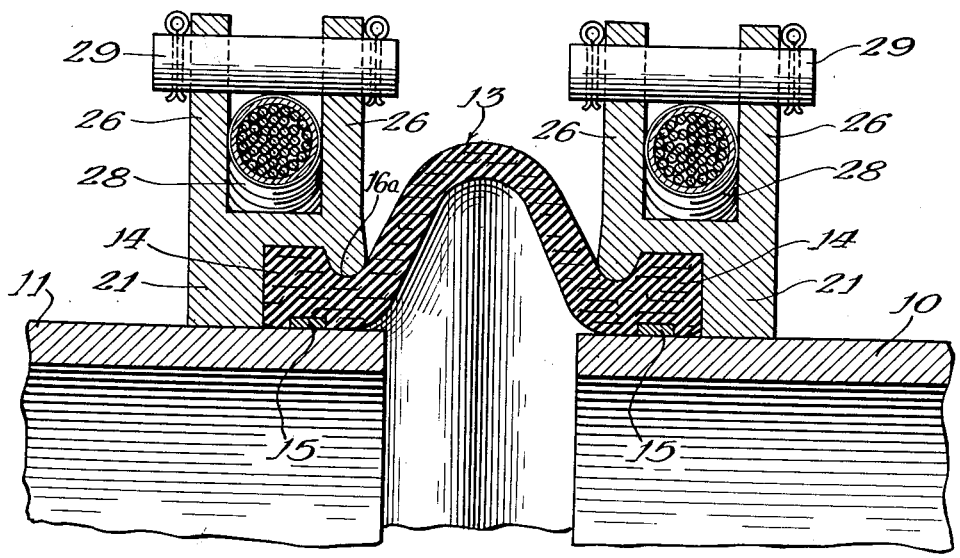
FIGURE 4 is an enlarged section taken substantially as indicated along the line 4—4 of FIGURE 2.
Figure 5:
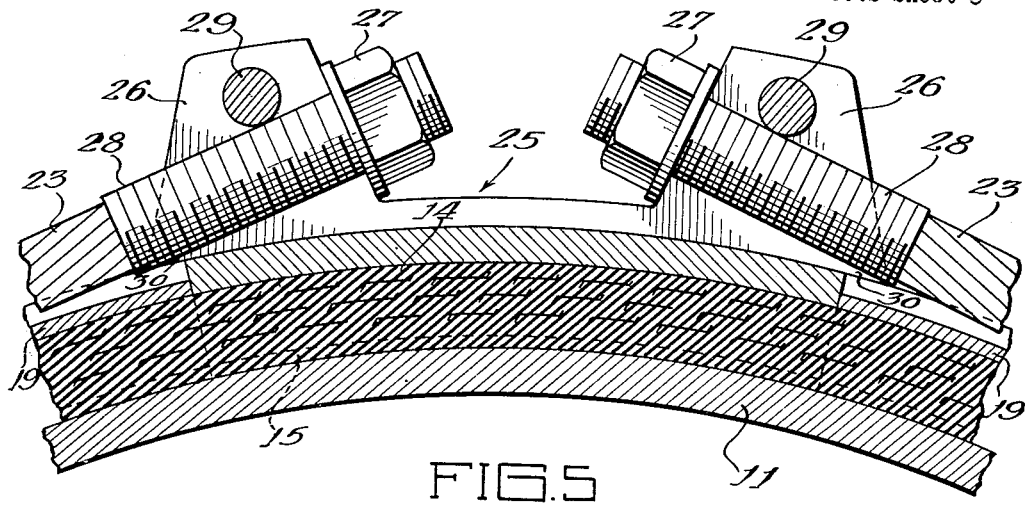
FIGURE 5 is an enlarged section taken substantially as indicated along the line 5—5 of FIGURE 1.

FIGURE 8 is a section taken substantially as indicated along the line 8—8 of FIGURE 7; and FIGURES 9, 10, and 11 are fragmentary, enlarged sections taken, respectively, generally along the lines 9—9, 10—10 and 11—11 of FIGURE 8.

The invention is, in brief, directed to a coupler assembly for joining adjacent ends of large diameter pipes or fittings. For easy handling and transportation to the point of installation, the coupler assembly may be compactly packaged and is simply arranged for installation. Included in the coupler assembly is a flexible and resilient annulus which has opposite enlarged end sections telescopically received over adjacent pipe sections with a relatively soft seal urged into tight sealing engagement between the adjacent pipe sections and end sections by a series of closely spaced arcuate segments interlocking and overlying each annulus end section and pipe section. Clamping means are tightly secured around each series of segments to complete the assembly.

Referring to FIGURES 1–5 of the drawings, a pair of large diameter pipe sections 10 and 11 are provided with means in the form of a coupler securely connecting the pipe sections in such a manner that precise alignment of the pipe sections is unnecessary, and in which the pipe sections are connected for relative movement therebetween both longitudinally and radially, as by vibration and expansion and contraction between the pipe sections. The pipe sections may be easily connected in the field because close tolerances therebetween are of no consequence. Secure fluid tight attachment to each pipe section provides a durable, easily replaced, vibration absorbing coupler assembly which may be conveniently compacted for easier transportation and handling at the point of installation. In this instance a coupler assembly 12 between the pipe sections 10 and 11 has a resilient coupler member in the form of an annulus or sleeve 13. The annulus 13 has a pair of cylindrical end sections 14 each telescopically received on the opposite pipe sections 10 and 11. The inner face of each annulus end section 14 has a circumferential rectangular groove receiving sealing means in the form of a close fitting relatively soft sealing ring 15, preferably of rubber having a durometer hardness of about 35, and secured therein in any suitable manner as by adhesive. Prior to being installed on the pipe sections, the sealing rings 15 are sufficiently thick as to protrude slightly past the inner face of the annulus end sections 14.

In order to provide a dependable connection between large diameter pipe sections, the annulus 13 must be securely attached to the pipe sections in a fluid tight manner. This is here accomplished by a first abutment on each end section 14 and a cooperating second abutment fixed on the respective pipe sections 10 and 11. In the present instance the cooperating abutments take the form of outwardly extending flanges 17 on the end sections 14 and cooperating inwardly extending first flanges 18 on rigid arcuate segments 19 of a series of segments 20 extending circumferentially around each end section 14, with each segment slightly spaced from adjacent segments few thousandths of an inch. The inner ends of the first flanges 18 are rounded to more evenly distribute the stress on the annulus 13. Each arcuate segment 19 has a second inwardly extending flange 21 with an inner face engaging the outer surface of respective pipe sections 10 and 11 to limit the clamping action of the segment on the end section.

The segments 19 are each restrained against movement longitudinally of the pipe sections to positively anchor the annulus 13 on the pipe sections, and in the present embodiment a pair of pins 22 are each received in an aperture in each arcuate segment 19 and an aligned socket in the adjacent pipe section. End sections 14 and their sealing rings 15 are urged into fluid tight engagement with the adjacent pipe sections and are retained securely anchored on the adjacent pipe section by the series of arcuate segments 20 which are embraced by cables 23 received in grooves in the outer face of each arcuate segment 19, and overlying the end sections and sealing rings. To facilitate installation of the coupler assembly a pair of bails 24 are secured to each arcuate segment and overlie the cable to retain the cable properly in place on the series of segments 20. It has been found that the installation of the coupler assembly can be made easier by limiting the length of the cables 23, preferably to about 55 inches, and in the illustrated embodiment two cables 23 encircle a pipe approximately three feet in diameter. The coupling assembly is, of course, suitable for use on much larger pipe sections.

Means for conveniently tensioning the cables to urge each series of segments 20 inwardly for urging the adjacent annulus end section 14 into tightly clamped engagement with the pipe section, here are also arcuate segments in the form of saddle blocks 25. Each saddle block has its second flange 21 freely received on the outer surface of the respective pipe sections 10 and 11, that is the saddle blocks are not pinned to the pipe sections, but otherwise having the same structure as the arcuate segments 19, previously described, with the addition of means for tensioning the cables 23. These means are here in the form of outwardly extending arms 26 having outwardly diverging adjacent faces supporting clamping nuts 27 threadedly received on threaded sleeves 28 securely attached to each cable end in any suitable manner as by swaging. Installation of the coupling assembly is facilitated by easily detachable retaining pins 29 passing through aligned apertures in respective pairs of arms 26 and secured therein in any suitable manner as by cotter keys. Thus upon tightening of the cables 23 by means of the nuts 27, the second flange 21 of each arcuate segment 19 tightly engages the adjacent pipe sections 10 or 11, and the annulus end sections 14 are radially compressed by the arcuate segments 19 and are securely anchored to the adjacent pipe sections by the interlocking flanges 17 and 18. Each saddle is provided with a pair of ears 30 extending circumferentially outwardly and overlying the adjacent arcuate segments 19.

The annulus 13 is preferably flexible and resilient and must withstand the pressure within the pipeline, it must be resistant to abrasion, with sufficient body to remain clamped within the arcuate segments 19 and should be capable of being folded to form a compact mass for easier handling. In the present instance this is accomplished through the annulus 14 being built up of lapped layers of fabric, such as rayon or nylon mesh, and by way of example, a 4-ply, double twist, reverse woven lock cord mesh, eight ounces per square yard, and a suitable plastic material, preferably rubber, which may have a durometer hardness of 55–78, and herein preferably Buna N type rubber, so that the annulus may withstand a design pressure of about 100 p.s.i. within the pipeline. The annulus end portions 14 are preferably thicker and more rigid than the arched portion 16, annular recesses 16a being defined by said portion 16 adjacent said end portions 14.

Interlocking of the annulus end sections 14 with the adjacent series of segments 20 for positively retaining the annulus on the pipe sections 10 and 11 is provided by the cooperating abutments in the form of the flanges 17 and 18, respectively, of each end section 14 and the adjacent arcuate segments 19 which are pinned to the pipe sections. It should be noted that the rigid segment flanges 18 overlie the ends of the pipe sections 10 or 11 with their inner ends clamped against a radially thin portion of the annulus end sections 14, and the annulus end sections 14 are sufficiently firm and radially enlarged that they are retained clamped within the segments 19 by the segment flanges 18.

Figure 6:
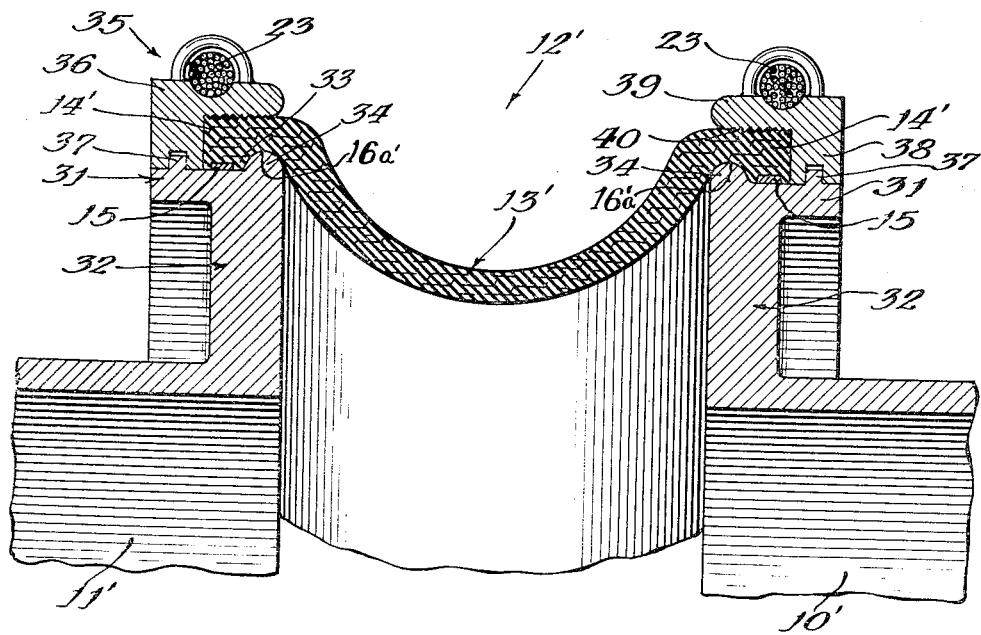
FIGURE 6 is a section, similar to FIGURE 3, of another embodiment of the invention.

Another embodiment of the invention is illustrated in FIGURE 6 wherein the coupler 12' connects pipe sections 10' and 11' of a pipeline under vacuum. The annulus 13' has opposite end sections 14', generally as previously described, each telescopically received on longitudinally disposed cylindrical flanges 31 of outwardly extending main flanges 32 on pipe sections 10' and 11'. Obstruction of the normal flow passages of the pipe line by the inwardly arched center portion of the annulus 13' is prevented by main flanges 32 which may extend radially outwardly as far as is necessary. Anchoring of the annulus 13' in a fluid tight manner on the pipe sections 10' and 11' is accomplished in this embodiment by means of first abutments on end sections 14' interlocked in a manner similar to that previously described, with second abutments on the pipe sections 10' and 11'. The end section abutments here take the form of inwardly extending flanges 33 cooperating with outwardly extending circumferential rounded flanges 34 on the outer end of main flanges 31 extending into annular recesses 16a' in the annulus 13' adjacent the end sections 14'. Sealing rings 15 are provided in the inner faces of the end sections 14' as previously described. Clamping means for anchoring the end sections 14' on the pipe sections 10' and 11' again include a series of segments 35 each with a plurality of closely spaced arcuate segments 36 clamped against the cylindrical flanges 32 by cables 23, as previously described. In the present instance longitudinal movement of the arcuate segments 36 is prevented by an outwardly extending rectangular circumferential flange 37, on the cylindrical flange 32, received in circumferential grooves in inwardly extending flanges 38 of the arcuate segments 36. Cylindrical flanges 39 overlie and are tightly clamped against the respective end section 14' by clamping means as previously described, and the inner face of the cylindrical flanges 39 are preferably provided with a gripping portion in the form of a knurled or toothed surface 40.

Another embodiment of clamping means for anchoring the annulus end sections on the pipe sections is illustrated in FIGURES 7–11, and is equally applicable to all of the foregoing embodiments, but is illustrated as applied to the embodiment of FIGURES 1–5. As previously described, the pair of annulus end sections 14 are telescopically received on opposite pipe sections 10 and 11 and are clamped to the respective pipe sections by a series of rigid arcuate segments 41 having annulus engaging portions as described in conjunction with FIGURES 1–5. Each segment 41 has a pair of bosses 43 each with a tangential hole 44 and groove 45 aligned with a similar tangential groove and hole on adjacent segment 41. Nuts 46 are threaded on opposite bolt ends which extend outwardly from the bosses 43. Each nut is tightened down against a shoulder on the adjacent boss thereby tightening the series of segments 41 around the respective annulus end sections 14 to clamp the end sections between the adjacent pipe sections and series of segments. Split pins resiliently retained in aligned holes in the segments 41 and the adjacent pipe section 10 or 11 restrain the segments against movement longitudinally of the pipe sections. As in the other embodiments, adjacent ends of the segments 41 are slightly spaced from each other. The bolted segment clamping assembly of FIGURES 7–11 may be painted and eliminates the need of the ears 30 which extend outwardly from the ends of saddle blocks 25.

The foregoing detailed description has been given for clearness of understanding only, and no unnecessary limitations should be understood therefrom for some modifications will be obvious to those skilled in the art.

I claim:

1. A coupling for use in connecting axially spaced, juxtaposed pipes, comprising: an annular resilient sleeve having axially opposite radially enlarged end portions adapted to extend about the opposed ends of axially spaced pipes, said sleeve having an arched portion projecting radially outwardly between said end portions and defining a radially outwardly opening annular recess adjacent each of said end portions; a pair of annular retainers for securing the sleeve end portions to the pipe ends, each of said retainers comprising at least three end-to-end aligned arcuate segments each having an axially outer portion adapted to extend circumjacent the pipe end axially outwardly of one sleeve end portion, said outer portion having a radially inner cylindrical surface, an axially extending middle portion having an inner diameter greater than the inner diameter of said outer portion, and an inner portion, said inner portion being spaced radially outwardly of the pipe end a distance less than the spacing of the middle portion radially outwardly of the pipe end; means for drawing the segments into a tight annular configuration about the pipe end with the inner cylindrical surface of said outer portion of the segments engaging the pipe end, the enlarged end portion of the sleeve being disposed between said mid-portion of the segments and the pipe end, the portion of the sleeve defining said annular recess being disposed between said inner portion of the segments and the pipe end and being tightly compressed therebetween, said inner portion of the segments abutting the adjacent enlarged end portion and arched portion of the sleeve; and means for retaining the segments against movement axially of the pipe end.

2. A coupling as specified in claim 1 including annular sealing means formed of a material softer than said sleeve end sections and mounted in annular grooves in the respective end sections.

3. The coupling of claim 1 wherein the means for drawing the segments comprises a pair of cables each extending approximately 180° about the annular retainer and means on diametrically opposed segments for securing one end of each of said cables, including means for drawing the cables tightly about said retainer.

4. The coupling of claim 1 wherein the means for drawing the segments comprises flange means on the opposite end portions of each segment and bolt means cooperating with the flange means for forcibly urging juxtaposed segments toward each other.

5. A coupling as specified in claim 1 wherein said segments of each retainer are slightly spaced from adjacent segments.

6. A coupling for use in connecting axially spaced, juxtaposed pipes, comprising: an annular resilient sleeve having axially opposite radially enlarged end portions adapted to extend about the opposed ends of axially spaced pipes, said sleeve having an arched portion projecting radially inwardly between said end portions and defining a radially inwardly opening annular recess adjacent each of said end portions; a pair of annular retainers for securing the sleeve end portions to the pipe ends, each of said retainers comprising at least three end-to-end aligned arcuate segments each having an axially outer portion adapted to extend circumjacent the pipe end axially outwardly of one sleeve end portion, said outer portion having a radially inner cylindrical surface, an axially extending middle portion having an inner diameter greater than the inner diameter of said outer portion, and an inner portion; radially projecting means on said pipe ends, said inner portion of the segments being spaced radially outwardly of the projecting means on the pipe ends a distance less than the spacing of the middle portion of the segments radially outwardly of the pipe end; means for drawing the segments into a tight annular configuration about the pipe end with the inner cylindrical surface of said outer portion of the segments engaging the pipe end, the enlarged end portion of the sleeve being disposed between said mid-portion of the segments and the pipe end, the portions of the sleeve defining said annular recesses being disposed between said inner portion of the segments and the projecting means on the pipe ends and being tightly compressed therebetween, said projecting means abutting the adjacent enlarged end portion and arched portion of the sleeve; and means for retaining the segments against movement axially of the pipe end.

7. A coupling as specified in claim 6 wherein said inner portion of said segments includes serrated gripping means tightly engaging said sleeve adjacent said end sections and the end sections themselves.

8. A coupling as specified in claim 6 wherein said inner portion of said segments includes serrated gripping means tightly engaging said sleeve adjacent said end sections.

References Cited in the file of this patent

UNITED STATES PATENTS

| | | |
|---|---|---|
| 1,558,503 | Pressler | Oct. 27, 1925 |
| 1,978,453 | Flynn | Oct. 30, 1934 |
| 2,353,572 | Kuster et al. | July 11, 1944 |
| 2,738,993 | Wilson | Mar. 20, 1956 |
| 2,879,084 | Staiger | Mar. 24, 1959 |
| 2,958,549 | Spafford | Nov. 1, 1960 |
| 2,973,977 | Stovall | Mar. 7, 1961 |
| 3,029,095 | King et al. | Apr. 10, 1962 |

FOREIGN PATENTS

| | | |
|---|---|---|
| 686,387 | Great Britain | Jan. 21, 1953 |